US011373268B2

(12) United States Patent
Alla et al.

(10) Patent No.: US 11,373,268 B2
(45) Date of Patent: Jun. 28, 2022

(54) APPARATUS AND METHOD FOR GRAPHICS PROCESSING UNIT HYBRID RENDERING

(71) Applicant: QUALCOMM Incorporated, San Diego, CA (US)

(72) Inventors: Srihari Babu Alla, San Diego, CA (US); Jonnala Gadda Nagendra Kumar, San Diego, CA (US); Avinash Seetharamaiah, San Diego, CA (US); Andrew Evan Gruber, Arlington, MA (US); Richard Hammerstone, Tyngsboro, MA (US); Thomas Edwin Frisinger, Shrewsbury, MA (US); Daniel Archard, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/039,873

(22) Filed: Sep. 30, 2020

(65) Prior Publication Data

US 2022/0101479 A1    Mar. 31, 2022

(51) Int. Cl.
*G06T 1/20* (2006.01)
*G06T 1/60* (2006.01)

(52) U.S. Cl.
CPC . *G06T 1/20* (2013.01); *G06T 1/60* (2013.01)

(58) Field of Classification Search
CPC .................................. G06T 1/20; G06T 1/60
USPC ........................................ 345/501, 530, 536
See application file for complete search history.

(56) References Cited

U.S. PATENT DOCUMENTS

| 2011/0273462 A1* | 11/2011 | Yang | ...................... G09G 5/393 |
| | | | 345/536 |
| 2013/0135341 A1* | 5/2013 | Seetharamaiah | ..... G06T 15/005 |
| | | | 345/619 |
| 2014/0267259 A1* | 9/2014 | Frascati | ................ G06T 15/005 |
| | | | 345/423 |

(Continued)

FOREIGN PATENT DOCUMENTS

| EP | 3663918 A1 | 6/2020 |
| WO | 2014168740 A2 | 10/2014 |

OTHER PUBLICATIONS

International Search Report and Written Opinion dated Dec. 10, 2021 from corresponding PCT Application No. PCT/US2021/048433.

(Continued)

*Primary Examiner* — Jacinta M Crawford
(74) *Attorney, Agent, or Firm* — Campbell C. Chiang; ArentFox Schiff LLP

(57) ABSTRACT

The present disclosure relates to methods and apparatus for hybrid rendering of video/graphics content by a graphics processing unit. The apparatus can configure the graphics processing unit of a display apparatus to perform multiple rendering passes for a frame of a scene to be displayed on a display device. Moreover, the apparatus can control the graphics processing unit to perform a first rendering pass of the multiple rendering passes to generate a first render target that is stored in either an on-chip graphics memory of the GPU or a system memory of the display apparatus. The apparatus can also control the graphics processing unit to perform a second rendering pass to generate a second render target that is alternatively stored in the system memory of the display apparatus or on-chip graphics memory of the GPU.

30 Claims, 9 Drawing Sheets

(56) References Cited

U.S. PATENT DOCUMENTS

| | | | | |
|---|---|---|---|---|
| 2014/0327671 A1* | 11/2014 | Nystad | ............... | G06T 15/005 |
| | | | | 345/426 |
| 2015/0187117 A1* | 7/2015 | Balci | ............... | G06T 1/20 |
| | | | | 345/522 |
| 2017/0161863 A1* | 6/2017 | Baral | ............... | G06T 15/80 |
| 2017/0358054 A1* | 12/2017 | Ciechanowski | ...... | G06T 15/005 |
| 2019/0108610 A1* | 4/2019 | Flordal | ............... | G06T 15/005 |

OTHER PUBLICATIONS

Mei Xinxin et al: "Benchmarking the Memory Hierarchy of Modern GPUs", Sep. 18, 2014 (Sep. 18, 2014), Advances in Biometrics : International Conference, ICB 2007, Seoul, Korea, Aug. 27-29, 2007 ; Proceedings; [Lecture Notes in Computer Science; Lect. Notes Computer], Springer, Berlin, Heidelberg, pp. 144-156, XP047491340, ISBN: 978-3-540-74549-5.

\* cited by examiner

APPARATUS AND METHOD FOR GRAPHICS PROCESSING UNIT HYBRID RENDERING

TECHNICAL FIELD

The present disclosure relates generally to processing systems and, more particularly, to one or more techniques for graphics or computer processing.

INTRODUCTION

Computing devices often utilize a graphics processing unit (GPU) or central processing unit (CPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A CPU may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a CPU or GPU of a device is configured to perform the processes in computer or graphics processing. However, with the increasing complexity of rendered content and the physical constraints of GPU memory, there has developed an increased need for improved computer or graphics processing.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

The present disclosure relates to methods and apparatus for hybrid rendering of video/graphics content by a graphics processing unit. The apparatus can configure the graphics processing unit of a display apparatus to perform multiple rendering passes for a frame of a scene to be displayed on a display device. Moreover, the apparatus can control the graphics processing unit to perform a first rendering pass of the multiple rendering passes to generate a first render target that is stored in either an on-chip graphics memory of the GPU or a system of the display apparatus. The apparatus can also control the graphics processing unit to perform a second rendering pass to generate a second render target that is alternatively stored in the system memory of the display apparatus or on-chip graphics memory of the GPU. In one aspect, an apparatus for hybrid rendering of content is provided with the apparatus comprising a memory; and at least one processor coupled to the memory and configured to configure a graphics processing unit (GPU) of a display apparatus to perform a plurality of rendering passes for at least one frame of a scene to be displayed on a display device; control the GPU to perform a first rendering pass of the plurality of rendering passes to generate at least one first render target that is stored in an on-chip graphics memory of the GPU; and control the GPU to perform a second rendering pass of the plurality of rendering passes to generate at least one second render target that is stored in a system memory of the display apparatus. In one aspect, the at least one second render target is not stored in the on-chip graphics memory of the GPU before being stored in the system memory of the display apparatus. In an aspect, the at least one processor is further configured to control the GPU to execute a resolve to copy the contents of the at least one first render target stored in the on-chip graphics memory of the GPU to the system memory for display by the display apparatus. In an aspect, the at least one first render target comprises an intermediate buffer of the plurality of rendering passes, with the intermediate buffer comprising a render that is produced during the first rendering pass and consumed during the second rendering pass. In an aspect, the at least one second render target comprises a final buffer of the plurality of rendering passes, with the final buffer comprising a render that is only produced during the second rendering pass and not consumed by a subsequent render pass. In an aspect, the at least one first render target is generated by a workload having a complexity that is greater than a complexity of a workload that generates the at least one second render target. In an aspect, the at least one processor is further configured to control the GPU to store directly in the system memory render targets having lower complexity workloads including the at least one second render target generated by the workload having the second complexity. In an aspect, the respective complexities of the workloads are based on at least one of a number of draws of the at least one frame, a number of shaders per draw of the at least one frame, and a number of primitives per draw of the at least one frame. In an aspect, the at least one processor is further configured to control the GPU to generate a plurality of primitives that make up the scene and sorting the plurality of primitives into a plurality of bins of the graphics memory during at least the first rendering pass of the plurality of rendering passes. In an aspect, the at least one processor is further configured to control the GPU to generate a visibility stream for each bin for the frame that indicates whether at least one primitive of the plurality of primitives in the respective bin will be visible in a final rendered scene. In an aspect, the at least one processor is further configured to control the GPU to perform the first and second rendering passes concurrently, such that the at least one first render target is stored in the on-chip graphics memory of the GPU and a same time that the at least one second render target is stored in the system memory of the display apparatus. In an aspect, the at least one processor is further configured to control the GPU to perform a third rendering pass subsequent to the first and second rendering passes, such that at least one third render target is stored in the on-chip graphics memory of the GPU after the at least one first render target is cleared therefrom. In an aspect, the at least one first render target comprises an albedo render target, a position render target, a normal render target and a depth render target.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1A:
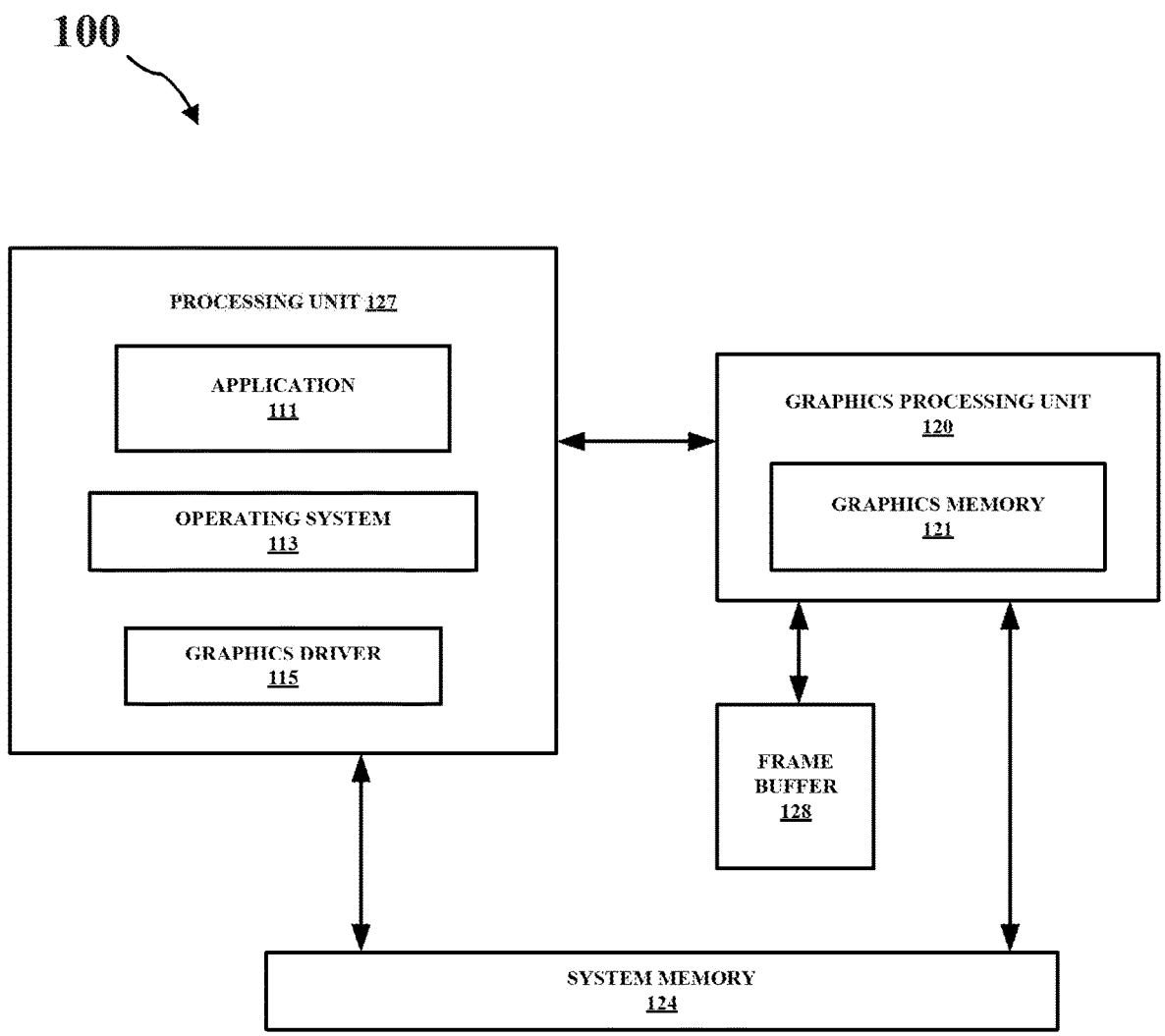
FIG. 1A is a block diagram that illustrates an example a content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a graphics processing unit ("GPU"). For example, this disclosure describes techniques for graphics processing in any device that utilizes graphics processing. Other example benefits are described throughout this disclosure.

Moreover, as used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a frame buffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

In general, GPUs can be used to render three-dimensional (3D) scenes. Because such rendering of 3D scenes can be very memory bandwidth-intensive, a specialized graphics memory ("GMEM") may be used. GMEM may be located close to the graphics-processing core of the GPU so that it has a very high memory bandwidth (i.e., read and write access to the GMEM is fast). A scene can be rendered by the graphics processing core of the GPU to the GMEM, and the scene can be resolved from GMEM to memory (e.g., a frame buffer) so that the scene can then be displayed at a display device. However, the size of the GMEM is limited due to physical memory constraints, such that the GMEM may not have sufficient memory capacity to contain an entire three-dimensional scene (e.g., an entire frame).

In some examples, a GPU or other processing device may be configured to split a 3D scene into tiles, so that each tile making up the scene can fit into GMEM. This is referred to as tile-based rendering or "binning". As an example, if the GMEM is able to store 512 kB of data, then a scene may be divided into tiles such that the pixel data contained in each tile is less than or equal to 512 kB. In this way, the GPU or other processor may render the scene by dividing the scene into tiles that can be rendered into the GMEM and individually rendering each tile of the scene into the GMEM, storing the rendered tile from GMEM to a frame buffer, and repeating the rendering and storing for each tile of the scene. Accordingly, the GPU can render the scene tile-by-tile using multiple rendering passes to render each tile of the scene.

In exemplary implementations, tile-based rendering may be performed in several steps. For example, a GPU implementing a tile-based architecture may initially process, or preprocess, an entire scene during a binning pass to define a number of bins or "tiles." The binning pass may be followed by a series of rendering passes, during which each of the defined tiles are rendered. In some examples, each of the rendering passes is completed in three stages: (1) clear/unresolve, (2) render, (3) resolve. During the clear/unresolve stage, the GPU may initialize GMEM for a new tile and store values into GMEM that have been read from an external memory. During rendering, the GPU may recreate the polygons associated with a current tile, as well as generate pixel values and finish a current tile, such that the tile can be displayed on a display. The resolve step may involve the GPU copying the contents of the on-chip memory (GMEM) to a system memory that is external to the GPU, such as a buffer for used by a display in displaying finished scenes.

During the binning pass, the GPU may generate polygons (e.g., triangles) that make up a scene and sort the polygons into the plurality of bins, which can be considered tiles of a final scene presented on a display). For example, each bin represents a portion of the final scene (e.g., a predefined portion of a frame of video data, computer-generated graphics image, still image, or the like). The tiles making up a scene can each be associated with a bin in memory that stores the primitives included in each respective tile. Thus, a binning pass can sort the primitives making up a scene into the appropriate bins. Moreover, the binning pass can also create a visibility stream for each bin for the frame that indicates whether any primitives in the bin will be visible in the final rendered scene or not. Accordingly, a visibility stream is a stream of bits that is configured as an input for the rendering passes to indicate whether or not a primitive is visible in each tile when rendered. If the visibility stream for a bin indicates that the bin does not contain any visible primitives (i.e., all of the primitives in the bin will not be visible in the final rendered scene), performance may be improved if the GPU does not render the primitives in the bin by skipping execution of the instructions in the indirect buffer associated with the bin.

In an exemplary aspect, of a multi-pass rendering, a scene and associated objects may be rendered multiple times. Each time the object is drawn, an additional aspect of object's appearance may be calculated and combined with the previous results. Generally, this may involve a coarse initial rendering and a detailed second rendering pass based on the query results of first coarse pass. For a tiled system, this may correspond to the following sequence: (1) a first pass rendering, also referred to as a coarse pass or a query pass in which a tiled-system may perform a binning pass that may generate a visibility stream, handle a loads, and renders, and stores for a rendering pass of the first pass; (2) a query check (may be by the application); the query check is a time when result of a query pass (the first pass) are checked; and (3) a second pass. The second pass may include all of the rendering done based on a query result of a first pass. In such an example, a tile-based system may perform a binning pass, generate visibility stream, and perform a load, a render, and a store for a rendering pass of this second pass (which may have a different set of detailed geometry based on application behavior, this is most likely the case).

In general, a graphics application triggers a query, renders a coarse pass (first pass), and then ends then query. The graphics application may check the query value (i.e., the number of pixels passed to detect if detailed rendering is required). Based on the query result (the graphics application may trigger a second pass). When the query is true a detailed scene may be rendered, when the query is false the scene may not be rendered at all or the coarse or but color pipe enable scene may be rendered. Accordingly, the second pass may include all of the rendering, which may or may not be performed based on the query result of the first pass.

FIG. 1A is a block diagram of a system 100 that includes a GPU for hybrid rendering in accordance with one or more techniques of this disclosure. As generally shown, the system 100 includes a processing unit 127, a GPU 120, and a system memory 124 configured to render a 3D scene according to an exemplary aspects. Processing unit 127 may execute software application 111, operating system (OS) 113, and graphics driver 115. Moreover, system memory 124 may include indirect buffers that store the command streams for rendering primitives as well as secondary commands that are to be executed by GPU 120. GPU 120 may include graphics memory (GMEM) 121 that may be "on-chip" with GPU 120. As described in more detailed with respect to FIG. 1B, the components of system 100 may be part of a device, including, but are not limited to, video devices, media players, set-top boxes, wireless handsets such as mobile telephones and so-called smartphones, personal digital assistants (PDAs), desktop computers, laptop computers, gaming consoles, video conferencing units, tablet computing devices, and the like.

Processing unit 127 may be the central processing unit (CPU). GPU 120 may be a processing unit configured to perform graphics related functions such as generate and output graphics data for presentation on a display, as well as perform non-graphics related functions that exploit the massive processing parallelism provided by GPU 120. Because GPU 120 may provide general-purpose processing capabilities in addition to graphics processing capabilities, GPU 120 may be referred to as a general purpose GPU (GP-GPU). Examples of processing unit 127 and GPU 120 include, but are not limited to, a digital signal processor (DSP), a general purpose microprocessor, application specific integrated circuit (ASIC), field programmable logic array (FPGA), or other equivalent integrated or discrete logic circuitry. In some examples, GPU 120 may be a microprocessor designed for specific usage such as providing massive parallel processing for processing graphics, as well as for executing non-graphics related applications. Furthermore, although processing unit 127 and GPU 120 are illustrated as separate components, aspects of this disclosure are not so limited and can be, for example, residing in a common integrated circuit (IC).

Software application 111 that executes on processing unit 127 may include one or more graphics rendering instructions that instruct processing unit 127 to cause the rendering of graphics data to a display (not shown in FIG. 1A). In some examples, the graphics rendering instructions may include software instructions may conform to a graphics application programming interface (API). In order to process the graphics rendering instructions, processing unit 127 may issue one or more graphics rendering commands to GPU 120 (e.g., through graphics driver 116) to cause GPU 120 to perform some or all of the rendering of the graphics data. In some examples, the graphics data to be rendered may include a list of graphics primitives, e.g., points, lines, triangles, quadrilaterals, triangle strips, etc.

GPU 120 may be configured to perform graphics operations to render one or more graphics primitives to a display. Accordingly, when one of the software applications executing on processing unit 127 requires graphics processing, processing unit 127 may provide graphics commands and graphics data to GPU 120 for rendering to the display. The graphics data may include, e.g., drawing commands, state information, primitive information, texture information, etc. GPU 120 may, in some instances, be built with a highly-parallel structure that provides more efficient processing of complex graphic-related operations than processing unit 127. For example, GPU 120 may include a plurality of processing elements that are configured to operate on multiple vertices or pixels in a parallel manner.

GPU 120 may be directly coupled to GMEM 121. In other words, GPU 120 may process data locally using a local storage, instead of off-chip memory. This allows GPU 120 to operate in a more efficient manner by eliminating the need of GPU 120 to read and write data via, e.g., a shared bus, which may experience heavy bus traffic. GMEM 121 may include one or more volatile or non-volatile memories or storage devices, such as, e.g., random access memory (RAM), static RAM (SRAM), dynamic RAM (DRAM), and one or more registers.

Processing unit 127 and/or GPU 120 may store rendered image data in a frame buffer 128, which may be may be an independent memory or may be is allocated within system memory 124. A display processor may retrieve the rendered image data from frame buffer 128 and display the rendered image data on a display.

System memory 124 may be a memory in the device and may reside external to processing unit 127 and GPU 120, i.e., off-chip with respect to processing unit 127, and off-chip with respect to GPU 120. System memory 124 may store applications that are executed by processing unit 127 and GPU 120. Furthermore, system memory 124 may store data upon which the executed applications operate, as well as the data that result from the application.

System memory 124 may store program modules, instructions, or both that are accessible for execution by processing unit 127, data for use by the programs executing on processing unit 127 102, or two or more of these. For example, system memory 118 may store a window manager application that is used by processing unit 127 to present a graphical user interface (GUI) on a display. In addition, system memory 124 may store user applications and application surface data associated with the applications. As explained in detail below, system memory 124 may act as a device memory for GPU 120 and may store data to be operated on by GPU 120 as well as data resulting from operations performed by GPU 120. For example, system memory 135 may store any combination of texture buffers, depth buffers, stencil buffers, vertex buffers, frame buffers, or the like.

Examples of system memory 124 include, but are not limited to, a random access memory (RAM), a read only memory (ROM), or an electrically erasable programmable read-only memory (EEPROM), or any other medium that can be used to carry or store desired program code in the form of instructions or data structures and that can be accessed by a computer or a processor. As one example, system memory 124 may be removed from the device, and moved to another device. As another example, a storage device, substantially similar to system memory 124, may be inserted into the device.

Figure 1B:
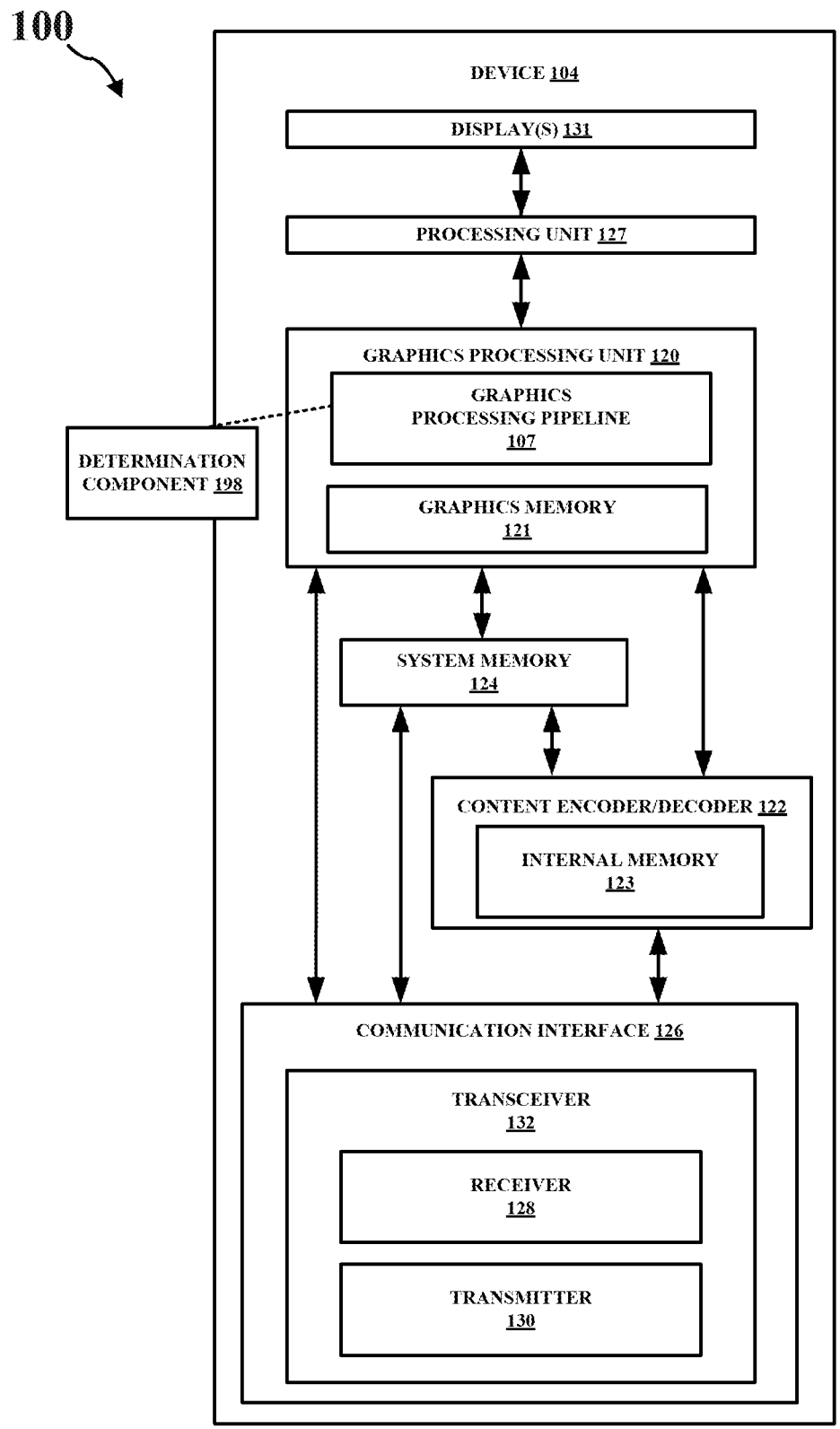
FIG. 1B is a block diagram that illustrates an example a content generation system in accordance with one or more techniques of this disclosure.

FIG. 1B is a more detailed block diagram that illustrates an example content generation system 100 configured to implement one or more techniques of this disclosure. It is noted that the content generation system 100 shown in FIG. 1B corresponds to that of FIG. 1A. In this regard, the content generation system 100 of FIG. 1B includes a processing unit 127, a GPU 120 and a system memory 124.

As further shown, the content generation system 100 includes a device 104 that may include one or more components configured to perform one or more techniques of this disclosure. In the example shown, the device 104 may include a GPU 120, a content encoder/decoder 122, and system memory 124. In some aspects, the device 104 can include a number of additional and/or optional components, e.g., a communication interface 126, a transceiver 132, a receiver 128, and a transmitter 130, and one or more displays 131. Reference to the display 131 may refer to the one or more displays 131. For example, the display 131 may include a single display or multiple displays. The display 131 may include a first display and a second display. In further examples, the results of the graphics processing may not be displayed on the device, e.g., the displays 131 may not receive any frames for presentment thereon. Instead, the frames or graphics processing results may be transferred to another device. In some aspects, this can be referred to as hybrid-rendering.

The GPU 120 includes graphics memory (GMEM) 121. The GPU 120 may be configured to perform graphics processing, such as in a graphics processing pipeline 107. The content encoder/decoder 122 may include an internal memory 123. In some examples, the device 104 may include a display processor, such as the processing unit 127, to perform one or more display processing techniques on one or more frames generated by the GPU 120 before presentment by the one or more displays 131 as described above. The display processor 127 may be configured to perform display processing. The one or more displays 131 may be configured to display or otherwise present frames processed by the processing unit 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the GPU 120 and the content encoder/decoder 122, such as system memory 124 as described above, may be accessible to the GPU 120 and the content encoder/decoder 122. For example, the GPU 120 and the content encoder/decoder 122 may be configured to read from and/or write to external memory, such as the system memory 124. The GPU 120 and the content encoder/decoder 122 may be communicatively coupled to the system memory 124 over a bus. In some examples, the GPU 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The GMEM 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that GMEM 121 or the system memory 124 is non-movable or that its contents are static. As one example, the system memory 124 may be removed from the device 104 and moved to another device. As another example, the system memory 124 may not be removable from the device 104.

The GPU may be configured to perform graphics processing according to the exemplary techniques as described herein. In some examples, the GPU 120 may be integrated into a motherboard of the device 104. In some examples, the GPU 120 may be present on a graphics card that is installed in a port in a motherboard of the device 104, or may be otherwise incorporated within a peripheral device configured to interoperate with the device 104. The GPU 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the GPU 120 may store instructions for the software in a suitable, non-transitory computer-readable storage medium and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content encoding/decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1A, in certain aspects, the graphics processing pipeline 107 may include a hybrid render controller 198 that is coupled to the GPU 120 is can configure the GPU to perform a plurality of rendering passes for at least one frame of a scene to be displayed on a display device. Moreover, the hybrid render controller 198 can control the GPU to perform a first rendering pass of the plurality of rendering passes to generate at least one first render target that is stored in an on-chip graphics memory of the GPU; and also control the GPU to perform a second rendering pass of the plurality of rendering passes to generate at least one second render target that is stored in a system memory of the display apparatus. In an aspect, the hybrid render controller 198 can control the GPU to execute a resolve to copy the contents of the at least one first render target stored in the on-chip graphics memory of the GPU to the system memory for display by the display apparatus. In another aspect, the hybrid render controller 198 can control the GPU to store directly in the system memory render targets having lower complexity workloads including the at least one second render target generated by the workload having the second complexity. In yet another aspect, the hybrid render controller 198 can control the GPU to generate a plurality of primitives that make up the scene and sorting the plurality of primitives into a plurality of bins of the graphics memory during at least the first rendering pass of the plurality of rendering passes. In an additional aspect, the hybrid render controller 198 can control the GPU to perform the first and second rendering passes concurrently, such that the at least one first render target is stored in the on-chip graphics memory of the GPU and a same time that the at least one second render target is stored in the system memory of the display apparatus. Moreover, the hybrid render controller 198 can control the GPU to perform a third rendering pass subsequent to the first and second rendering passes, such that at least one third render target is stored in the on-chip graphics memory of the GPU after the at least one first render target is cleared therefrom.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component, e.g., a GPU, but, in further embodiments, can be performed using other components, e.g., a CPU, consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
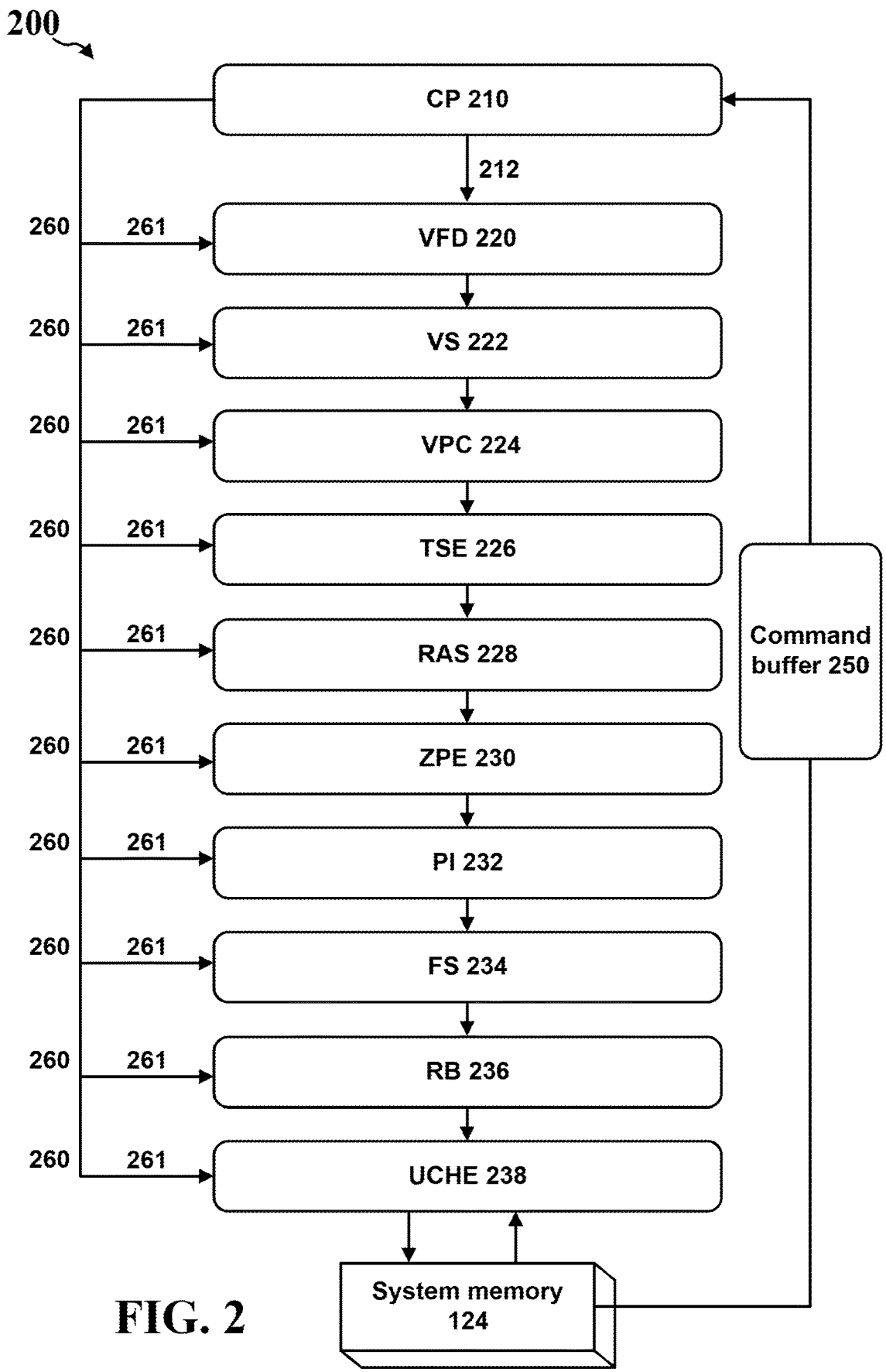
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

As described above, a GPU may be configured to split a 3D scene into tiles, so that each tile making up the scene can fit into GMEM. This is referred to as tile-based rendering or "binning", which is designed to reduce power consumption and save memory bandwidth by breaking the scene into multiple bins and performing a visibility pass that identifies the triangles that are visible in each bin.

Figure 3:
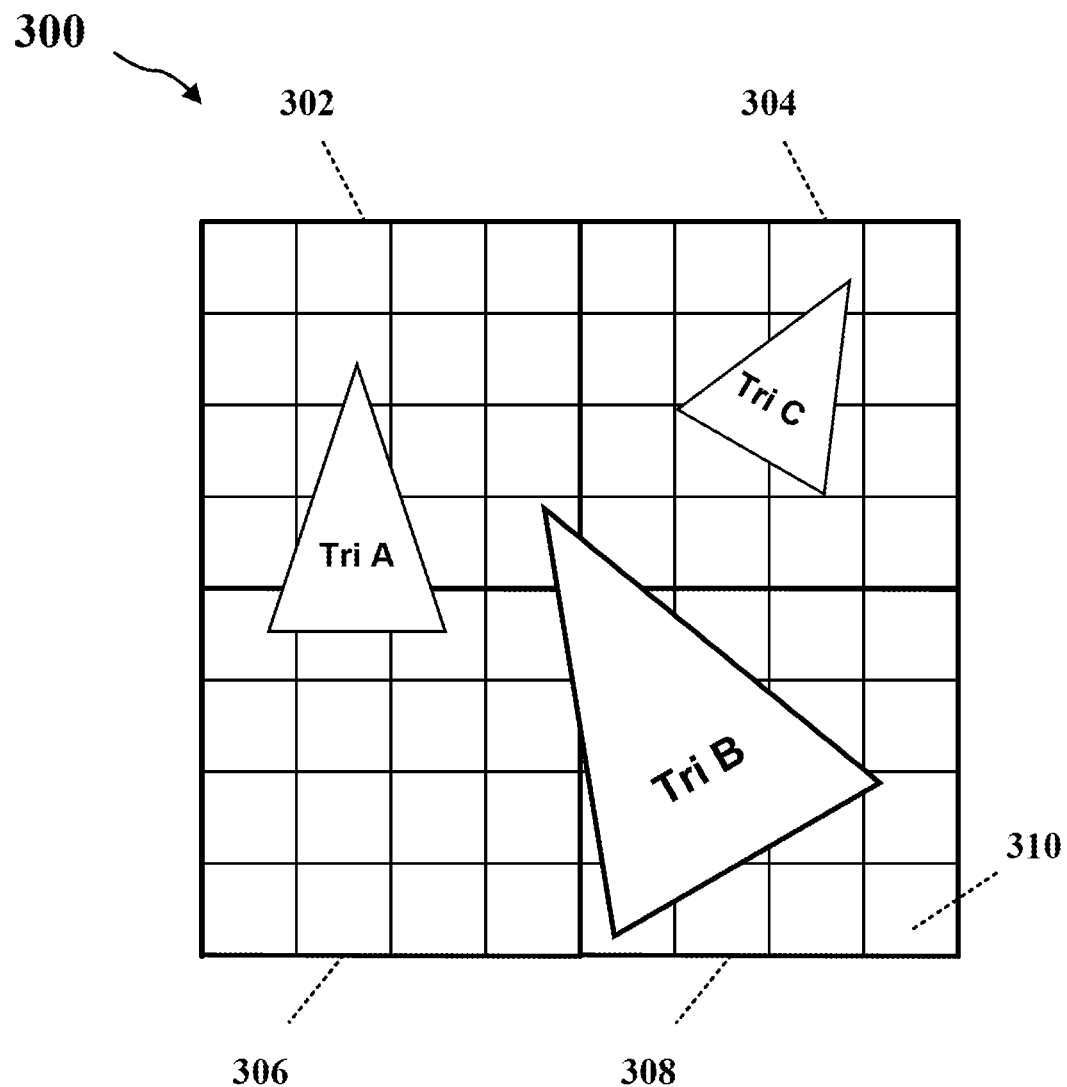
FIG. 3 is a conceptual diagram showing primitives divided amongst bins according to aspects of the present disclosure.

FIG. 3 is a conceptual diagram showing primitives divided amongst bins according to aspects of the present disclosure. As shown, bins 302, 304, 306 and 308 each contain a 4×4 grid of pixels (as an example) are rendered/rasterized to contain multiple pixels 310. Generally, video rendering is the process of generating an image based on an existing object or model.

One or more graphics primitives may be visible in each bin. For example, portions of triangle A ("Tri A") are visible in both bin 302 and bin 306. Portions of triangle B ("Tri B") are visible in each of the four bin 302-308. Triangle C ("Tri C") is only visible in bin 304. During a rendering pass, GPU 120 may split a scene into bins and may assign triangles to the bins. If the triangle is visible in more than one bin, GPU 120 may assign the triangle to just one of the bins in which the triangle is visible, so that the triangle is not rendered multiple times as each of the bins 302, 304, 306, and 308 are rendered.

GPU 120 may also determine which triangles in the bin are actually visible in the final rendered scene. For example, some triangles may be behind one or more other triangles and will not be visible in the final rendered scene. In this way, triangles that are not visible need not be rendered for that bin. As noted above, this is referred to as a visibility pass that identifies the triangles that are visible in each bin as inputs for the passes.

While performing a particular rendering pass, the pixel data for the bin associated with that particular rendering pass may be stored in a memory, such as GMEM 121 (sometimes called a bin buffer). After performing the rendering pass, GPU 120 may transfer the contents of GMEM 122 to a system memory (SYSMEM) 124. After transferring the contents of GMEM 122 to frame buffer 124, GPU 120 may initialize the GMEM 122 to default values and begin a subsequent rendering pass with respect to a different bin.

In some aspects of GPU processing, multi-sample anti-aliasing (MSAA) is performed where multiple samples are generated for a single pixel and then combined (e.g., averaged) to determine a final pixel value. In another aspect, pixel processing tasks may include pixel shading computations that may output values to one or more buffers in the GMEM as multiple render targets (MRTs). MRTs allow pixel shaders to optionally output to more than one render target, each with the same screen dimensions, but with a different pixel format. In general, MSAA and MRT processes greatly increase the effective bit depth of the color and depth buffers, which in turn decreases the size of each bin. As a result, to render a scene requires a significantly larger number of bins that can greatly impact overall performance and efficiency of the GPU.

In deferred rendering, the GPU may be configured for multi-pass rendering (e.g., a series of rendering passes as discussed above), which will result in many attachments in the GMEM at the same time, which will cause the smaller bin sizes. Smaller bin sizes means many bin-render passes that will add processing with partial draws. In other words, referring back to FIG. 3, if each bin is reduced from a 4×4 pixel bin to a 2×2 pixel bin, there will be more primitives that are in multiple bins (e.g., "Tri C" may be in four bins rather than a single bin 304), which requires multiple render passes.

Figure 4:
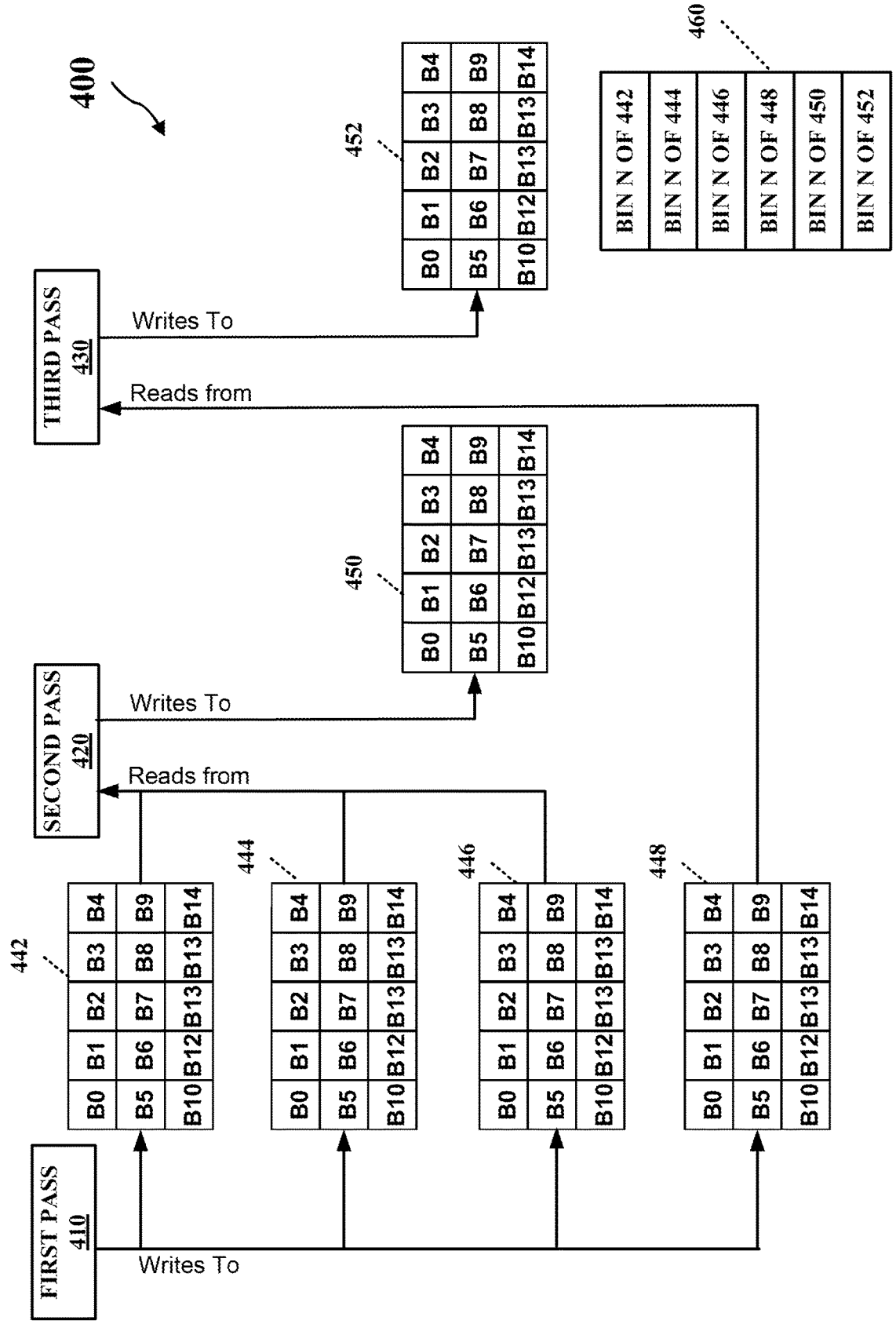
FIG. 4 illustrates an example diagram of a bin rendering in accordance with one or more techniques of this disclosure.

FIG. 4 illustrates an example diagram of a bin rendering in accordance with one or more techniques of this disclosure. As shown, diagram 400 illustrates a multi-pass rendering with six render targets 442, 444, 446, 448, 450 and 452. In general, it should be appreciated that of the six render targets comprises 15 bins, but this is meant merely as an example and that there can be more or less bins for each render target as would be appreciated to one skilled in the art. Similarly, each subsequent render target described below can have more or less than the number of bins for each render target in accordance with various implementations of the apparatuses, systems and methods described herein.

As described above, a first pass rendering 410, which may also be referred to as a G-buffer pass or a query pass as examples of pass renderings, is executed by the GPU 120 in which a tiled-system may perform a binning pass that may generate a visibility stream. In this example, the first pass rendering 410 writes to four render targets 442 (e.g., albedo), 444 (e.g., positions), 446 (e.g., normal) and 448 (e.g., depth). In this example, it should be appreciated that frame is tiled into 3×5 bins (e.g., bin 0 to bin 14) as denoted by B0, B1 . . . B14. As noted above, each bin is a portion of memory in GMEM 121 of GPU 120.

As further shown, a second pass rendering 420 (e.g., a main pass) is then performed which reads the rendering from bin buffers of each render targets 442 (e.g., albedo), 444 (e.g., positions), 446 (e.g., normal) and write to a fifth render target 450 (e.g., main). Moreover, a third render pass 430 (e.g., transparent objects) reads from render target 448 (e.g., depth) to a sixth render target 452 (e.g., main). It should be appreciated that the example shown in FIG. 4 can be implemented with any number of passes and any number of render targets per pass. However, the more the number of render targets in this binning mode means that each bin will be smaller with more overall bins as described above.

Moreover, the GMEM will contain the bins of all the render target attachments for each pass. Thus, the bin render passes are looped for all bins as described above. That is, GPU 120 must perform the resolve step after each render target attachment is stored in the GMEM 121 in which the GPU 120 copies the contents of the GMEM 121 to system memory 124 that is external to the GPU 120, which can be used by a display in displaying finished scenes as described above. The content is then cleared for the bin render-pass. As further shown, reference 460 illustrates an example of the contents of the GMEM 121 during the multi-pass render processing. As shown, bin N of each render target 442, 444, 446, 448, 450 and 452 will be stored in the GMEM 121 as the bin render passes are looped for all bins. Accordingly, overall performance of the GPU 120 can greatly be affected for complex (relative) operations, such as MSAAs and MRTs, which call for smaller bin sizes and leading to many bin-render passes that add processing with partial draws, as described above Thus, in one example aspect, the GPU 120 can be configured or tuned to split which render targets are stored in GMEM 121 and which render targets are stored directly in system memory 124 (SYSMEM). In other words, GPU configured for multi-pass rendering can be further configured for hybrid rendering in which a first portion of the render targets are stored in bin buffers of GMEM 121 as described above, while a second portion of the render targets are stored directly in SYSMEM 124. The configuration of the hybrid rendering of the GPU 120 can be based on whether the render target is an intermediate render or final render, depending on the complexity of the workload of the specific render target, dependent on the number of primitives per draw, or the like, the details of which will now be described.

Figure 5:
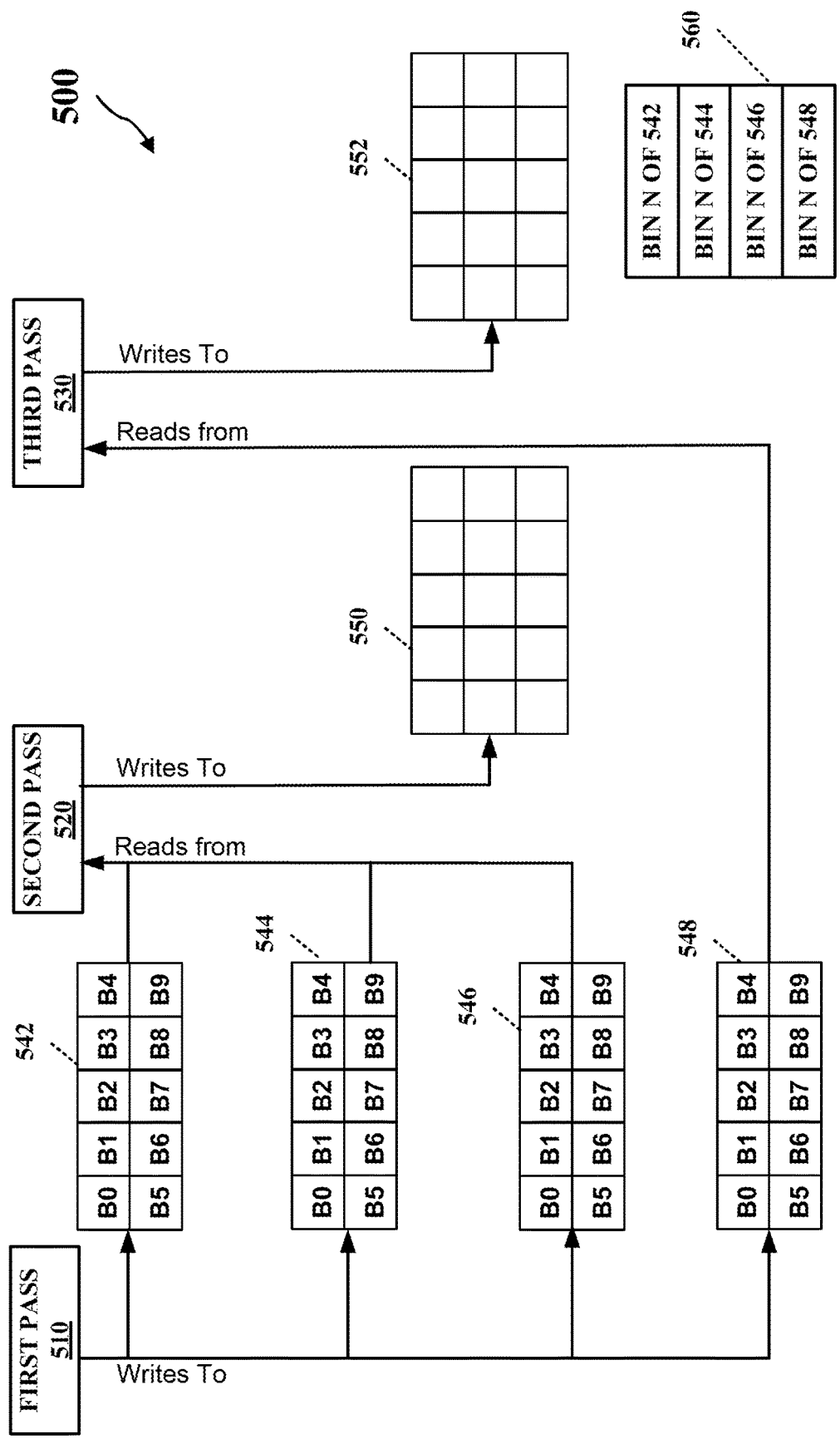
FIG. 5 illustrates an example diagram of a content generation processing in accordance with one or more techniques of this disclosure.

FIG. 5 illustrates an example diagram 500 of a content generation processing in accordance with one or more techniques of this disclosure. As described above, a hybrid render controller 198 is coupled to the GPU 120 to configure which target renders are stored locally in GMEM 121 and which target renders are stored in SYSMEM 124. In one aspect as shown in FIG. 5, hybrid render controller 198 configures GPU 120 to store all "intermediate" buffers (e.g. G-Buffers) that are produced in once pass and consumed in the next pass to be stored in GMEM 120. Moreover, hybrid render controller 198 configures GPU 120 to store all other buffers (e.g., final frame buffers configured for displaying finished scenes as described above).

In general, FIG. 5 illustrates a similar multi-pass rendering as shown above with respect to FIG. 4. That is, the multi-pass rendering of diagram 500 provides for six render targets 542, 544, 546, 548, 550 and 552, but it is again noted that the exemplary techniques disclosed herein can be provided for any number of targets. In one aspect, a first pass rendering 510 is executed by the GPU 120 to write to four render targets 542 (e.g., albedo), 544 (e.g., positions), 546

(e.g., normal) and 548 (e.g., depth). In this aspect, render targets 542, 544, 546 and 548 are intermediate render targets in that the first pass 510 writes to the respective bins of GMEM 121 and that the second pass 520 and the third pass 530 also read from these render targets 542, 544, 546 and 548 as inputs thereto.

However, in this aspect and unlike the example of FIG. 4, the second pass rendering 520 (e.g., a main pass) reads the rendering from bin buffers of each render targets 542 (e.g., albedo), 544 (e.g., positions), 546 (e.g., normal) and write to a fifth render target 550 (e.g., main) that is stored in SYSMEM 124 instead of GMEM 121. In other words, the rendering can be considered a hybrid render in that this final render (i.e., no further passes read from the bins of render target 550). Similarly, the third render pass 530 (e.g., transparent objects) reads from render target 548 (e.g., depth) and writes to a sixth render target 552 (e.g., main) that also stored in SYSMEM 124 instead of GMEM 212.

Reference 560 illustrates an example of the contents of the GMEM 121 during the multi-pass render processing. As shown, bin N of each render target 542, 544, 546, and 548 will be stored in the GMEM 121 as the bin render passes are looped for all bins, but the contents of render targets 550 and 552 are stored directly in SYSMEM 124. As a result, the hybrid rendering effectively frees up memory of GMEM 121. In turn, it should be appreciated that the frame is tiled into 2×5 bins (e.g., bin 0 to bin 9) as denoted by B0, B1 . . . B9 and that these bins will correspond to tiles of the frame buffer that are larger in pixels than the bins shown in the multi-pass rendering of FIG. 4. In turn, the larger bin sizes means less bin-render passes that will reduce processing requirements with fewer partial draws.

Thus, according to an aspect, the hybrid render controller 198 can be configured to choose the render mode and program the buffer location per color/depth render target so that "write only" render targets can be stored directly in SYSMEM 124 instead of GMEM 121. By doing so, the GPU 120 can also skip the resolve/unresolve processes for the render targets (e.g., surfaces) stored directly in SYSMEM 124 since there will not be content for these target renders in the bin buffers that needs to be copied to SYSMEM 124 and at the same time keep the binning overhead low, i.e., keeping the bin sizes as high as possible as shown in the contrast between FIG. 4 and FIG. 5.

In this aspect, the hybrid render controller 198 (e.g., a software application or driver) can be configured to choose the color, stencil and/or depth attachments to be stored in either the SYSMEM 124 or GMEM 121. By providing this flexibility of a hybrid render, the apparatus and method as disclosed herein expands the design and configuration of the GPU 120 to enable fine-grained control over which buffers are stored in GMEM 121 and which buffers are stored in SYSMEM 121. This in turn enables the display application for the frame to access the buffer location bits independently depending on where the buffer is stored. Effectively, the hybrid render controller 198 may be configured to generate an optimal binning layout by choosing some attachments to be stored in GMEM 121 and other attachments to be stored in SYSMEM 124.

As described above, one exemplary selection criteria for the hybrid rendering can be based on which attachments are intermediate and which attachments are write only. In another aspect, the criteria can be based on the complexity of the render operations. For example, low complex MRT attachments can be stored directly in SYSMEM 124 to increase the bin size for the remaining attachments (higher complex attachments) that are stored in GMEM 121.

Figure 6:
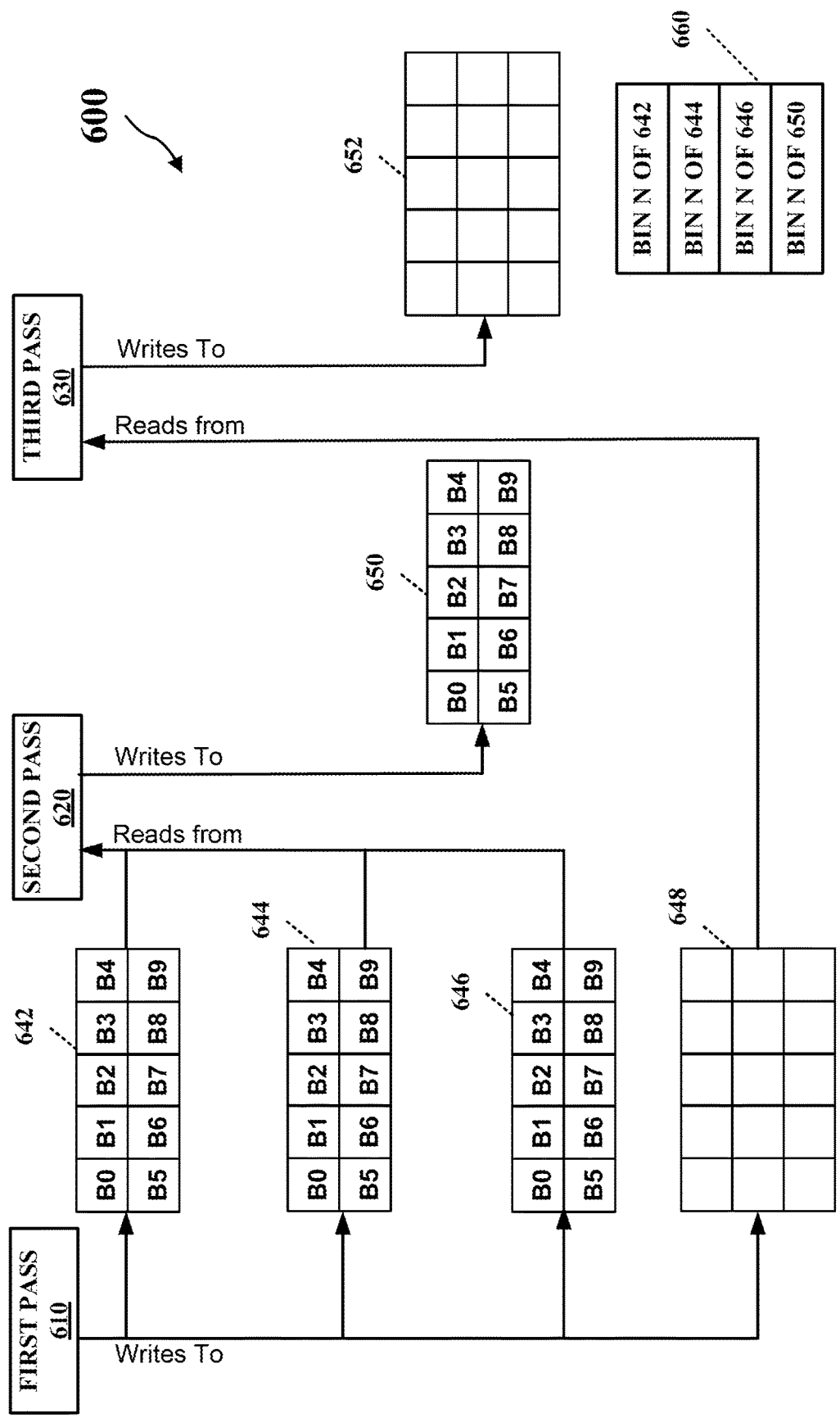
FIG. 6 illustrates an example diagram of a content generation processing in accordance with one or more techniques of this disclosure.

FIG. 6 illustrates an example diagram of a content generation processing in accordance with one or more techniques of this disclosure. In general, FIG. 6 illustrates a refinement of the multi-pass rendering as described above with respect to FIG. 5. That is, the multi-pass rendering of diagram 600 provides for six render targets 642, 644, 646, 648, 650 and 652, but it is again noted that the exemplary techniques disclosed herein can be provided for any number of targets. In one aspect, a first pass rendering 610 is executed by the GPU 120 to write to four render targets 642 (e.g., albedo), 644 (e.g., positions), 646 (e.g., normal) and 648 (e.g., depth). In this aspect, the GMEM 121 stores the render targets 542, 544, 546 and 550 that is read in the second pass.

However, in this aspect and unlike the example of FIG. 5, render targets 648 and 652 are stored directly in SYSTEM 124. Thus, similar to the hybrid rendering described above, the example aspect of FIG. 6 can be a hybrid render with the less complex attachments (e.g., render targets 648 and 652) stored directly in SYSMEM 124. In other words, the hybrid render controller 198 may be configured to control and/or configure GPU 120 to store the render targets based on the complexity of the passes, i.e., the complexity of the workload. In an aspect, the complexity of the passes may be dependent on the number of draws, complexity of shaders per draw, number of primitives per draw, total number of primitives or the like, required for the pass. In one aspect, if the numbers are above a certain predetermined threshold, the hybrid render controller 198 can deem the workload as "complex" and configure the GPU 120 to store that render target in GMEM 121, whereas the less complex attachments (e.g., below the threshold) are stored in SYSTEM 124.

Reference 660 illustrates an example of the contents of the GMEM 121 during the multi-pass render processing of FIG. 6. As shown, bin N of each render target 542, 544, 546, and 550 will be stored in the GMEM 121 as the bin render passes are looped for all bins, but the contents of render targets 448 and 552 (e.g., less complex renders) are stored directly in SYSMEM 124. As a result, the hybrid rendering effectively frees up memory of GMEM 121. In turn, it should be appreciated that the frame is tiled into 2×5 bins (e.g., bin 0 to bin 9) as denoted by B0, B1 . . . B9 for those bins in GMEM 121 (e.g., target renders 642, 644, 646 and 650). As a result, the larger bin sizes means less bin-render passes that will again reduce processing requirements with fewer partial draws.

Figure 7:
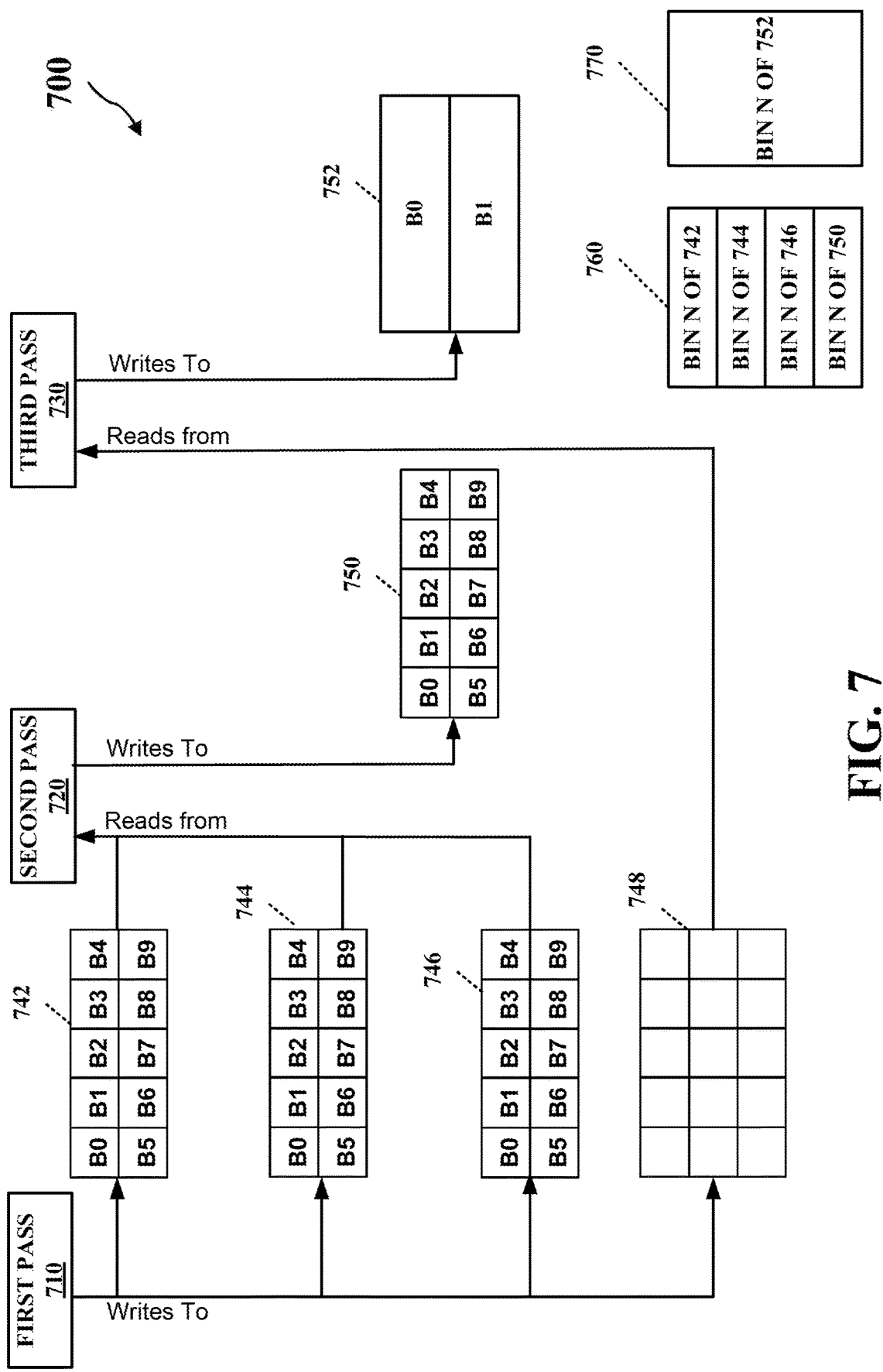
FIG. 7 illustrates an example diagram of a content generation processing in accordance with one or more techniques of this disclosure.

FIG. 7 illustrates an example diagram of a content generation processing in accordance with one or more techniques of this disclosure. In this aspect, the hybrid rendering is similar to diagrams 500 and 600 as described above. As described above with respect to diagram 600, the hybrid rendering of diagram 700 similarly configures GPU 120 to store the content of the bins read in the second pass in the GMEM 121 where the remaining attachments are stored in SYSMEM 124.

More particularly, the multi-pass rendering of diagram 700 provides for six render targets 742, 744, 746, 748, 750 and 752, in which a first pass rendering 710 is executed by the GPU 120 to write to four render targets 742 (e.g., albedo), 744 (e.g., positions), 746 (e.g., normal) and 748 (e.g., depth). In this aspect, the GMEM 121 stores the render targets 542, 544 and 546. Moreover, the second pass rendering 720 stores render target 750 to GMEM 121. However, in this aspect, the first and second pass renderings are run concurrently. As a result, reference 660 (which illustrates the contents of the GMEM 121 during the first pass render 710 and the second pass render 720) will contain bin N of each render target 742, 744, 746, and 750 as the bin render passes are looped for all bins. Moreover, in this aspect, the third pass render 730 is run independently after the first and second pass renders 710 and 720. As a result, the on chip GMEM 121 of the third pass render 730 will store the content of bin 752.

In general, it is noted that each of diagrams 500, 600 and 700 as described above provide for a hybrid rendering for generating display content (e.g., 3D content) in order to efficiently manage the use of on chip GMEM 121. Thus, in an aspect, a hybrid render controller 198 is coupled to the GPU 120 and is configured to tune the GPU 120 for controlling which target renders are stored locally in GMEM 121 and which target renders are stored in SYSMEM 124. As also described above, the parameters for tuning the rendering can be varied and controlled for the specific chipset and/or particular content generation application for which the GPU 120 is being implemented. Effectively, the hybrid render controller 198 may be configured to generate an optimal binning layout for the GPU 120 and/or application 111 by determining certain attachments to be stored in GMEM 121 and other attachments to be stored in SYSMEM 124 based on defined parameters.

Figure 8:
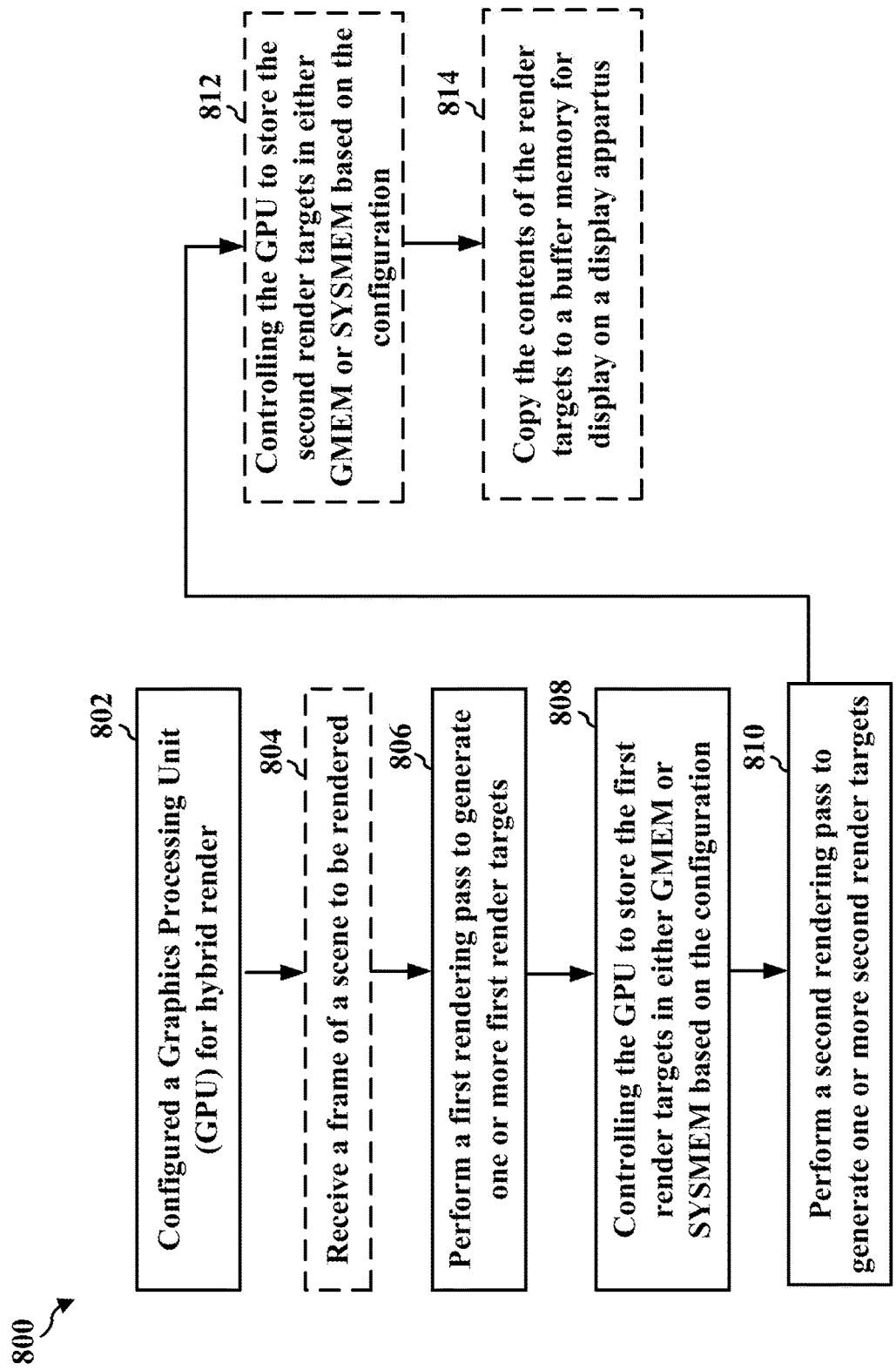
FIG. 8 illustrates an example flowchart of an example method for content generation in accordance with one or more techniques of this disclosure.

FIG. 8 illustrates an example flowchart of an example method for content generation in accordance with one or more techniques of this disclosure. The method 800 may be performed by an apparatus, such as a GPU 120, as described above. In an aspects, the steps highlighted by a dashed box illustrate optional steps in an aspect of the technique described herein.

At block 802, a CPU is configured to perform a hybrid render as described above. In an aspect, the selection criteria for the hybrid rendering can be based on which attachments are intermediate and which attachments are write only. In another aspect, the criteria can be based on the complexity of the render operations to determine whether the target render is stored in GMEM 121 or SYSMEM 124.

At block 804, the GPU 120 receives a first frame of a scene to be rendered. It should be appreciated that the process described herein can be repeated for a plurality of frames for a scene of video content. At block 806, the GPU is configured to perform a first rendering pass to generate one or more first render targets (e.g., an albedo render target, a position render target, a normal render target and/or a depth render target). At block 808, the GPU determines whether to store the content of the one or more first render targets in the GMEM or SYSMEM based on the configurations for the hybrid render as discussed above. As described each bin N of each render target will be stored in either the GMEM 121 according to the configuration and as the bin render passes are looped for all bins.

Similarly, at block 810, the GPU 120 is configured to perform a second rendering pass to generate one or more second render targets, which be use the data of the first render targets as input data for performing the second rendering passes. At block 812, the GPU determines whether to store the content of the one or more second render targets in the GMEM or SYSMEM based on the configurations for the hybrid render as also discussed above. Finally, at block 814, the render content can be read out from the bin buffers to a buffer memory, for example, to be subsequently displayed on a display apparatus.

The subject matter described herein can be implemented to realize one or more benefits or advantages. For instance, the techniques disclosed herein enable the GPU 120 to reduce the local storage required to render a scene by configuring the GPU 120 to store a first portion of target renders in the multi-pass rendering in the GMEM 121 and a second portion of target renders in the multi-pass rendering in the SYSMEM 124. As a result, less memory use is required by the on-chip GMEM for each pass, which, in turn, leads to larger bin sizes and thus less bin-render passes that will reduce the overall processing requirements with fewer partial draws. As a result the apparatus and method further reduce the power consumption and load requirements of the GPU 120 since it is storing less data into the on-chip graphics memory. This result in turn improves the overall performance of the GPU since the latency of waiting for ready data is also reduce. Thus, the processing techniques herein can improve or speed up data processing or execution and also improve resource or data utilization and/or resource efficiency.

The subject matter described herein can be implemented to realize one or more benefits or advantages. For instance, the described graphics processing techniques can be used by a server, a client, a GPU, a CPU, or some other processor that can perform computer or graphics processing to implement the split rendering techniques described herein. This can also be accomplished at a low cost compared to other computer or graphics processing techniques. Moreover, the computer or graphics processing techniques herein can improve or speed up data processing or execution. Further, the computer or graphics processing techniques herein can improve resource or data utilization and/or resource efficiency.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware.

Various examples have been described. These and other examples are within the scope of the following claims.

What is claimed is:

1. A method for hybrid rendering of content, the method comprising:
    configuring a graphics processing unit (GPU) of a display apparatus to perform a plurality of rendering passes for at least one frame of a scene to be displayed on a display device;
    controlling the GPU to perform a first rendering pass of the plurality of rendering passes to generate at least one first render target using a first workload having a first complexity that exceeds a predetermined threshold and to store the at least one first render target in an on-chip graphics memory of the GPU; and
    controlling the GPU to perform a second rendering pass of the plurality of rendering passes that is subsequent to the first rendering pass that reads the at least one first render target from the on-chip graphics memory of the GPU to generate at least one second render target using a second workload having a second complexity that does not exceed the predetermined threshold and to store the at least one second render target in a system memory of the display apparatus.

2. The method according to claim 1, wherein the at least one second render target is not stored in the on-chip graphics memory of the GPU before being stored in the system memory of the display apparatus.

3. The method according to claim 1, further comprising controlling the GPU to execute a resolve to copy contents of the at least one first render target stored in the on-chip graphics memory of the GPU to the system memory for display by the display apparatus.

4. The method according to claim 1, wherein the at least one first render target comprises an intermediate buffer of the plurality of rendering passes, with the intermediate buffer comprising a render that is produced during the first rendering pass and consumed during the second rendering pass.

5. The method according to claim 4, wherein the at least one second render target comprises a final buffer of the plurality of rendering passes, with the final buffer comprising a render that is only produced during the second rendering pass and not consumed by a subsequent render pass.

6. The method according to claim 1, wherein the at least one first render target is generated by the first workload having the first complexity that is greater than the second complexity of the second workload that generates the at least one second render target.

7. The method according to claim 6, further comprising controlling the GPU to store directly in the system memory render targets having lower complexity workloads including the at least one second render target generated by the second workload having the second complexity.

8. The method according to claim 6, wherein the first complexity of the first workload and the second complexity of the second workload are each based on at least one of a number of draws of the at least one frame, a number of shaders per draw of the at least one frame, and a number of primitives per draw of the at least one frame.

9. The method according to claim 1, further comprising controlling the GPU to generate a plurality of primitives that make up the scene and sorting the plurality of primitives into a plurality of bins of the on-chip graphics memory during at least the first rendering pass of the plurality of rendering passes.

10. The method according to claim 9, further comprising controlling the GPU to generate a visibility stream for each bin for the at least one frame that indicates whether at least one primitive of the plurality of primitives in a respective bin will be visible in a final rendered scene.

11. The method according to claim 1, further comprising controlling the GPU to perform the first rendering pass and the second rendering pass concurrently and to store the at least one first render target and the at least one second render target at a same time in the on-chip graphics memory of the GPU.

12. The method according to claim 11, further comprising controlling the GPU to perform a third rendering pass subsequent to the first rendering pass and the second rendering pass and to store at least one third render target in the on-chip graphics memory of the GPU after the at least one first render target is cleared therefrom.

13. The method according to claim 1, wherein the at least one first render target comprises an albedo render target, a position render target, a normal render target and a depth render target.

14. An apparatus for hybrid rendering of content, the apparatus comprising:
    a memory; and
    at least one processor coupled to the memory and configured to:
        configure a graphics processing unit (GPU) of a display apparatus to perform a plurality of rendering passes for at least one frame of a scene to be displayed on a display device;
        control the GPU to perform a first rendering pass of the plurality of rendering passes to generate at least one first render target using a first workload having a first complexity that exceeds a predetermined threshold and to store the at least one first render target in an on-chip graphics memory of the GPU; and
        control the GPU to perform a second rendering pass of the plurality of rendering passes that is subsequent to the first rendering pass that reads the at least one first render target from the on-chip graphics memory of the GPU to generate at least one second render target using a second workload having a second complexity that does not exceed the predetermined threshold and to store the at least one second render target in a system memory of the display apparatus.

15. The apparatus of claim 14, wherein the at least one second render target is not stored in the on-chip graphics memory of the GPU before being stored in the system memory of the display apparatus.

16. The apparatus of claim 14, wherein the at least one processor is further configured to control the GPU to execute a resolve to copy contents of the at least one first render target stored in the on-chip graphics memory of the GPU to the system memory for display by the display apparatus.

17. The apparatus of claim 14, wherein the at least one first render target comprises an intermediate buffer of the plurality of rendering passes, with the intermediate buffer comprising a render that is produced during the first rendering pass and consumed during the second rendering pass.

18. The apparatus of claim 17, wherein the at least one second render target comprises a final buffer of the plurality of rendering passes, with the final buffer comprising a render that is only produced during the second rendering pass and not consumed by a subsequent render pass.

19. The apparatus of claim 14, wherein the at least one first render target is generated by the first workload having the first complexity that is greater than the second complexity of the second workload that generates the at least one second render target.

20. The apparatus of claim 19, wherein the at least one processor is further configured to control the GPU to store directly in the system memory render targets having lower complexity workloads including the at least one second render target generated by the second workload having the second complexity.

21. The apparatus of claim 19, wherein the first complexity of the first workload and the second complexity of the second workload are each based on at least one of a number of draws of the at least one frame, a number of shaders per draw of the at least one frame, and a number of primitives per draw of the at least one frame.

22. The apparatus of claim 14, wherein the at least one processor is further configured to control the GPU to generate a plurality of primitives that make up the scene and sorting the plurality of primitives into a plurality of bins of the on-chip graphics memory during at least the first rendering pass of the plurality of rendering passes.

23. The apparatus of claim 22, wherein the at least one processor is further configured to control the GPU to generate a visibility stream for each bin for the at least one frame that indicates whether at least one primitive of the plurality of primitives in a respective bin will be visible in a final rendered scene.

24. The apparatus of claim 14, wherein the at least one processor is further configured to control the GPU to perform the first rendering pass and the second rendering pass concurrently and to store the at least one first render target and the at least one second render target at a same time in the on-chip graphics memory of the GPU.

25. The apparatus of claim 24, wherein the at least one processor is further configured to control the GPU to perform a third rendering pass subsequent to the first rendering pass and the second rendering pass and to store at least one third render target in the on-chip graphics memory of the GPU after the at least one first render target is cleared therefrom.

26. The apparatus of claim 14, wherein the at least one first render target comprises an albedo render target, a position render target, a normal render target and a depth render target.

27. An apparatus for hybrid rendering of content, the apparatus comprising:
  means for configuring a graphics processing unit (GPU) of a display apparatus to perform a plurality of rendering passes for at least one frame of a scene to be displayed on a display device;
  means for controlling the GPU to perform a first rendering pass of the plurality of rendering passes to generate at least one first render target using a first workload having a first complexity that exceeds a predetermined threshold and to store the at least one first render target in an on-chip graphics memory of the GPU; and
  means for controlling the GPU to perform a second rendering pass of the plurality of rendering passes that is subsequent to the first rendering pass that reads the at least one first render target from the on-chip graphics memory of the GPU to generate at least one second render target using a second workload having a second complexity that does not exceed the predetermined threshold and to store the at least one second render target in a system memory of the display apparatus.

28. The apparatus according to claim 27, wherein the at least one first render target comprises an intermediate buffer of the plurality of rendering passes, with the intermediate buffer comprising a render that is produced during the first rendering pass and consumed during the second rendering pass.

29. A non-transitory computer-readable medium storing computer executable code for hybrid rendering of content by a graphics processing unit (GPU), the code when executed by a processor causes the processor to:
  configure the GPU of a display apparatus to perform a plurality of rendering passes for at least one frame of a scene to be displayed on a display device;
  control the GPU to perform a first rendering pass of the plurality of rendering passes to generate at least one first render target using a first workload having a first complexity that exceeds a predetermined threshold and to store the at least one first render target in an on-chip graphics memory of the GPU; and
  control the GPU to perform a second rendering pass of the plurality of rendering passes that is subsequent to the first rendering pass that reads the at least one first render target from the on-chip graphics memory of the GPU to generate at least one second render target using a second workload having a second complexity that does not exceed the predetermined threshold and to store the at least one second render target in a system memory of the display apparatus.

30. The non-transitory computer-readable medium according to claim 29, wherein the at least one first render target comprises an intermediate buffer of the plurality of rendering passes, with the intermediate buffer comprising a render that is produced during the first rendering pass and consumed during the second rendering pass.

* * * * *